United States Patent
Runje et al.

(10) Patent No.: US 11,551,063 B1
(45) Date of Patent: Jan. 10, 2023

(54) IMPLEMENTING MONOTONIC CONSTRAINED NEURAL NETWORK LAYERS USING COMPLEMENTARY ACTIVATION FUNCTIONS

(71) Applicant: Airt technologies ltd., Zagreb (HR)

(72) Inventors: Davor Runje, Zagreb (HR); Sharath Makki Shankaranarayana, Bengaluru (IN)

(73) Assignee: AIRT TECHNOLOGIES LTD., Zagreb (HR)

( * ) Notice: Subject to any disclaimer, the term of this patent is extended or adjusted under 35 U.S.C. 154(b) by 0 days.

(21) Appl. No.: 17/736,956

(22) Filed: May 4, 2022

(51) Int. Cl.
*G06N 3/04* (2006.01)
*G06N 3/08* (2006.01)

(52) U.S. Cl.
CPC ............. *G06N 3/0481* (2013.01); *G06N 3/08* (2013.01)

(58) Field of Classification Search
CPC ............................... G06N 3/0481; G06N 3/08
See application file for complete search history.

(56) References Cited

U.S. PATENT DOCUMENTS

2022/0147817 A1* 5/2022 Boardman ......... G06Q 10/0635

FOREIGN PATENT DOCUMENTS

CN    107729984 A  *  2/2018

OTHER PUBLICATIONS

Agostinelli, Forest, et al. "Learning activation functions to improve deep neural networks." arXiv preprint arXiv:1412.6830 (2014). (Year: 2014).*

* cited by examiner

*Primary Examiner* — Hal Schnee
(74) *Attorney, Agent, or Firm* — Seed IP Law Group, LLP

(57) ABSTRACT

A facility for generating monotonic fully connected layer blocks for a machine learning model is described. The facility receives an indication of a convex constituent monotonically increasing activation function and a concave constituent monotonically increasing activation function for a monotonic layer. The facility generates a composite monotonic activation function made up of the convex and concave constituent activation functions. The facility receives an indication of a monotonicity indicator vector for the monotonic dense layer block. The facility determines one or more selector weights for the composite activation function. The facility initializes a sign for each weight of one or more kernel weights included in the monotonic layer and initializes a bias vector. The facility generates the monotonic dense layer block based on the composite activation function, the monotonicity indicator vector, the selector weights, the sign for each kernel weight, and the bias vector.

17 Claims, 7 Drawing Sheets

Monotonic Dense Layer Block no Activation

Final Activation

US 11,551,063 B1

IMPLEMENTING MONOTONIC CONSTRAINED NEURAL NETWORK LAYERS USING COMPLEMENTARY ACTIVATION FUNCTIONS

BACKGROUND

Machine learning and deep learning models (collectively "machine learning models") have been increasingly used in many applications such as finance, healthcare, and other applications. Enforcing monotonicity in these machine learning models ensures that the machine learning models conform to prior knowledge and increase the confidence in the adoption and use of the machine learning models.

DETAILED DESCRIPTION

Figure 1:
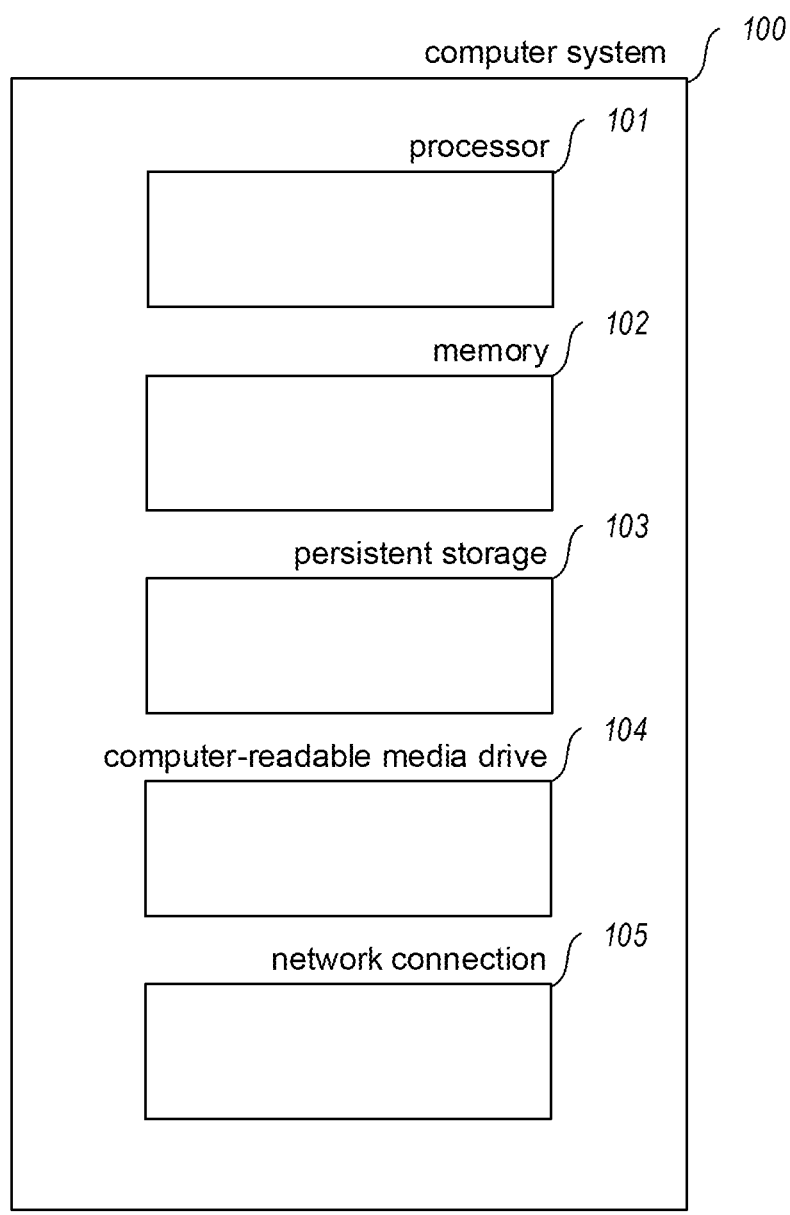
FIG. 1 is a block diagram showing some of the components typically incorporated in at least some of the computer systems and other devices on which the facility operates.

A function is said to be monotonic when it varies in such a way that it either never decreases or never increases in response to increases in its input. Due to legal, ethical and/or safety concerns, monotonicity of machine learning based predictive models with respect to some input or all the inputs is required in numerous domains such as financial (house pricing, credit scoring, insurance risk), healthcare (medical diagnosis, patient medication) and legal (criminal sentencing) to list just a few. All other things being equal, a larger house should be deemed more valuable, a bank's clients with higher income should be eligible for a larger loan, an offender with a longer crime history should be predicted as more likely to commit another crime. A model without such a monotonic property would not, and certainly should not, be trusted by the society to provide a basis for such important decisions. However, the monotonicity of deep learning models is not a guaranteed property even when trained on monotonic data, and even more difficult when training on noisy data typically encountered in the real-world. Data scientists have attempted to ensure that machine learning models used to make predictions involving these monotone problems behave monotonically. Typically, data scientists attempt to ensure that models are monotonic by 1) building a monotonic model by construction or 2) making the model monotonic by employing heuristic regularization that penalizes non-monotonicity.

The inventors have recognized a variety of disadvantages to using these processes to ensure that a machine learning model is monotonic. First, building monotonic models by enforcing weights to be either nonnegative or nonpositive introduces vanishing gradient problems and results in models which are not properly trained when used along with classical activation functions such as Sigmoid, Tanh, or other classical activation functions. Moreover, enforcing these weight constraints with certain activation functions, such as ReLU or ELU, forces the machine learning model to only be able to approximate convex monotonic functions. Although some machine learning models are able to approximate other monotonic functions, such as lattice networks and deep lattice networks (DLN), they tend to be structurally rigid, thereby restricting the hypothesis space significantly. Also, deep lattice networks require a very large number of parameters to adequately perform their operations because they use a combination of linear calibrators and lattices, which require large amounts of memory to train and use the machine learning model.

Furthermore, employing a regularization term to penalize non-monotonicity does not guarantee that the machine learning model is monotonic and the machine learning model typically needs to be trained multiple times in order to ensure monotonicity. This process involves training the machine learning model, performing tests to determine if the machine learning model is monotonic, re-training the model by strengthening regularization terms, and repeating the process until the machine learning model is monotonic. Thus, this process also requires a large amount of computing power and resources because multiple rounds of training and testing are required. Furthermore, because of the computer resources used in multiple rounds of training and checking, this method is disadvantageous when there is a large amount of data or when using large machine learning models.

In response to recognizing these disadvantages, the inventors have conceived and reduced to practice a software and/or hardware facility for implementing monotonic neural network layers ("the facility") along with the unsaturated monotonic activation functions such as Relu, ELU etc., which have been shown to work better than saturated monotonic activation functions, such as Sigmoid or Tanh. By using a combination of an unsaturated monotonic activation function and its point reflection around origin, the facility is able to learn any monotonic function, as opposed to only being able to learn convex monotonic functions.

The inventors have recognized that it would be of great benefit to developers, data scientists, etc., (collectively "data scientists") to implement monotonic neural network layers. The inventors have also determined that it would be beneficial to implement the monotonic neural networks in a more efficient manner than current methods.

The facility uses monotonically increasing composite activation functions made up of multiple complementary monotonically increasing constituent activation functions to create a monotonic fully connected layer. In some embodiments, the facility uses a pair of constituent activation functions to create the composite activation functions, such as one monotonically increasing concave activation function and one monotonically increasing convex activation function. A function of a single variable is concave if every line segment joining two points on its graph does not lie above the graph at any point. A function of a single variable is convex if every line segment joining two points on its graph does not lie below the graph at any point. A monotonically increasing concave function can be constructed by point reflection of a monotonically increasing convex function around the origin.

The facility receives an indication of constituent monotonic activation functions, such as via user input. In various embodiments, the monotonically increasing convex activation function is a ReLU function, ELU function, SELU function, softplus function, leaky ReLU function, or other monotonically increasing convex activation function. In some embodiments, the facility uses point reflection of a monotone convex activation function around the origin to obtain a complementary monotonically increasing concave activation function. In some embodiments, the facility weights the complementary activation functions against each other in the composite activation function using selector weights as shown by the function: $a'(x) = s\, a_1(x) + (1-s)\, a_2(x)$—where $a_1(x)$ is a monotonically increasing convex activation function and $a_2(x)$ is a monotonically increasing concave activation function and where the weights of the activation selector weights vector s haves values between 0 and 1 inclusively. In some embodiments, a monotonically increasing concave activation function is constructed by point reflection of a monotonically increasing convex function around the origin, producing the composite activation function as shown by the function: $a'(x) = s\, a(x) + (s-1)\, a(-x)$.

In some embodiments, the facility determines the selector weight for each element of the monotonic layer's output vector. In some embodiments, when the output is known to be convex with respect to inputs, the selector weights for all the neurons in the layer are set to 1. In some embodiments, when the output is known to be concave with respect to inputs, the selector weights for all the neurons in the layer are set to 0. In some embodiments, the facility determines the selector weight for each value of the layer's output vector of the composite function by setting the selector weights for a part of the output values to 1 and setting the selector weights for the other part of the output values to 0, either randomly or in a regular pattern, when the output vector is not known to be convex or concave.

In some embodiments, the facility learns the selector weight for each value of the layer's output vector. In some embodiments, the facility learns the selector weights by using auxiliary learnable weights to derive the selector weights for each output value. In some embodiments, the facility uses a function, such as $s_i = \sigma(w_{si})$, to determine the selector weights. In some embodiments, $\sigma$ represents a sigmoid function $\sigma(x) = 1/(1+e^x)$.

The facility ensures that some kernel weights used in the monotonic fully connected layer are signed(i.e. nonpositive or nonnegative values), such as by applying a one-dimensional indicator vector to the kernel weights to generate signed kernel weights in such a way that kernel weights corresponding to monotonically increasing variables are set to be non-negative and the kernel weights corresponding to monotonically decreasing variables are set to be non-positive.

The facility generates the monotonic fully connected layer by first enforcing the signs of weights associated with the layer with the help of the indicator vector. The monotonic fully connected layer applies the selector weights to the output of at least one activation function and combines the outputs of the activation functions to generate an output for the layer. In some embodiments, the monotonic fully connected layer applies multiple activation functions to the input values based on a weighted sum of the activation function used to generate the monotonic fully connected layer and the complementary function used to generate the monotonic fully connected layer.

By performing in some or all of the ways described above, the facility is able to efficiently train and implement monotonic neural networks.

Also, the facility improves the functioning of computer or other hardware, such as by reducing the processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by using two activation functions in a neural network layer, the facility is able to create monotonic neural network layers with fewer computing resources than current methods of creating monotonic neural network, such as deep lattice networks and certified monotonic networks.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or generating machine learning model layers, such as a CPU, GPU, TPU, NNP, Neural Network Accelerator, FPGA, or ASIC; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
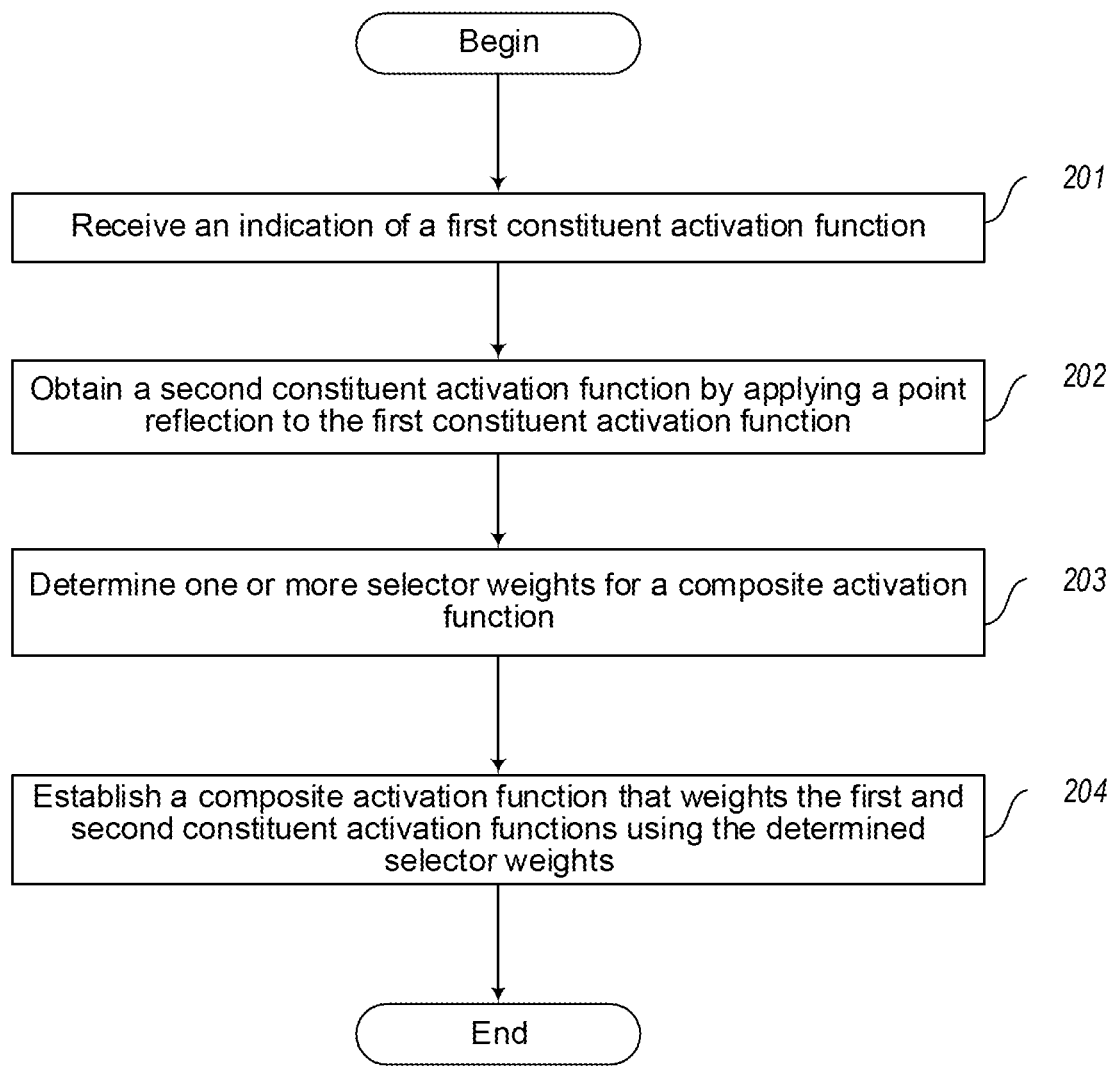
FIG. 2 is a flow diagram of a process to establish a monotonic composite activation function based on an indication of an activation function used by the facility in some embodiments.

FIG. 2 is a flow diagram of a process to establish a monotonic composite activation function based on an indication of an activation function used by the facility in some embodiments. First, at act 201, the facility receives an indication of a convex constituent monotonic activation function. In some embodiments, the convex constituent activation function is based on a mathematical function such as a ReLU function, ELU function, SELU function, softplus function, leaky ReLU function, or another monotonically increasing convex function.

At act 202, the facility obtains a concave constituent activation function by applying point reflection to the first constituent activation function, represented by the function $-a(-x)$, where the convex constituent activation function is represented by the function $a(x)$. In some embodiments, instead of point reflection of the convex constituent activation function, the facility receives an indication of a concave constituent activation function. In some embodiments, the concave constituent activation function is based on the same mathematical function as the convex constituent activation function. In some embodiments, the concave constituent activation function is based on a different activation function as the convex constituent activation function.

At act 203, the facility determines one or more selector weights for a composite activation function. In some embodiments, the one or more selector weights are weights for each value of the monotonic layer's output vector. In some embodiments, the one or more selector weights are used to weight each value of the monotonic layer's output vector by obtaining the Hadamard product of the output vector and the one or more selector weights. In some embodiments, the facility determines the one or more selector weights based on whether the indicated function to be learned by a monotonic neural network is convex or concave. In some embodiments, each selector weight of the one or more selector weights is a value between 0 and 1, inclusive of 0 and 1.

At act 204, the facility establishes a composite activation function that weights the convex constituent activation function and concave constituent activation function by using the determined selector weights. Thus, the composite activation function comprises at least one convex constituent activation function and at least one concave constituent activation function. In some embodiments, the composite activation function is represented by the equation a'(x)=s a(x)+(s−1) a(−x).

After act 204, the process ends.

Those skilled in the art will appreciate that the acts shown in FIG. 2 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 3:
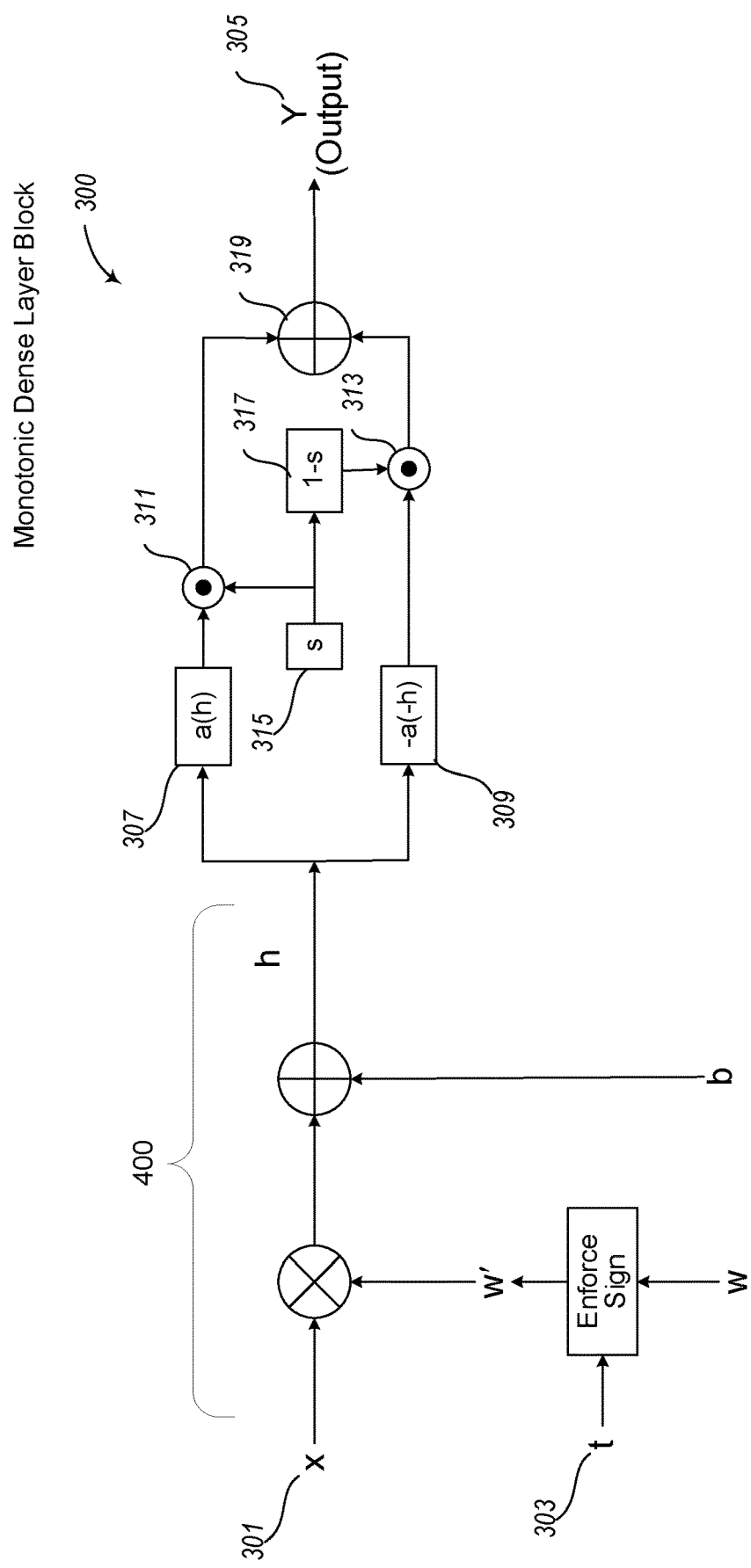
FIG. 3 is a block diagram showing a monotonic dense layer block generated by the facility in some embodiments.

FIG. 3 is a block diagram showing a monotonic dense layer block 300 generated by the facility in some embodiments. The monotonic dense layer block 300 includes an input vector 301, a monotonicity indicator vector 303, an output vector 305, a monotonic block without activation 400, a convex constituent activation function 307, a concave constituent activation function 309, selector weight applicators 311 and 313, selector weights 315 and 317, and an activation function output aggregator 319.

The input vector 301 is a vector which includes input values for the monotonic dense layer block 300. The output vector 305 is a vector which includes the output values of the monotonic dense layer block 300. The output values included in the output vector 305 are monotonic with respect to at least a portion of the input values included in the input vector 301. The monotonicity indicator vector 303 is a vector which includes values that indicate which of the input values included in the input vector 301 are monotonic with respect to the output values included in the output vector 305. In some embodiments, the vector monotonicity indicator vector 303 is represented by:

$$t_i = \begin{cases} 1 & \text{if } \frac{\partial y_j}{\partial x_i} \geq 0 \text{ for each } j \in \{1, \ldots, m\} \\ -1 & \text{if } \frac{\partial y_j}{\partial x_i} \leq 0 \text{ for each } j \in \{1, \ldots, m\} \\ 0 & \text{otherwise} \end{cases}$$

In such embodiments, t represents the monotonicity indicator vector 303.

Figure 4:
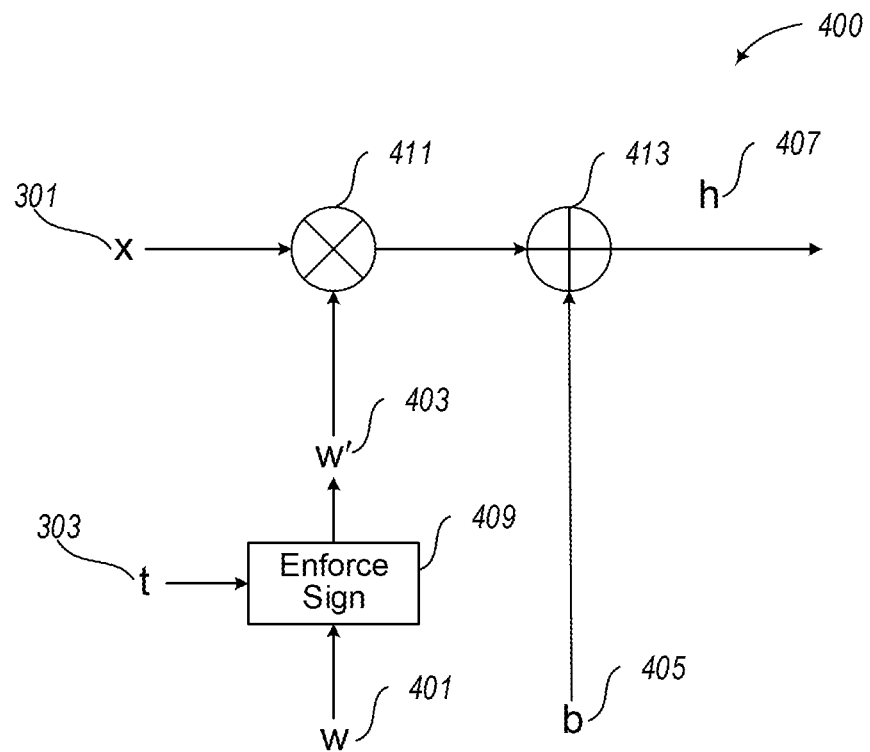
FIG. 4 is a block diagram depicting a monotonic block without activation used by the facility in some embodiments.

The monotonic block without activation 400 applies the monotonicity indicator vector 303 to the input vector 301 to output an intermediate output vector. FIG. 4 is a block diagram depicting a monotonic block without activation 400 used by the facility in some embodiments. The monotonic block without activation 400 includes kernel weights 401, adjusted kernel weights 403, a bias vector 405, an intermediate output vector 407, an enforce sign block 409, and aggregators 411 and 413.

The kernel weights 401 indicate one or more weights for one or more input values included in the input vector 303. The adjusted kernel weights 403 indicate one or more adjusted kernel weights which are applied to the input vector 301. For example, the kernel weights may be adjusted to ensure they are either non-negative or non-positive based on monotonicity indicator vector 303 signed, such as by using an enforce sign block 409.

The enforce sign block 409 receives a monotonicity indicator vector 303 to kernel weights 401 to generate adjusted kernel weights 403. In some embodiments, the "enforce sign" function is represented by:

$$w'_{i,j} = \begin{cases} \text{abs}(w_{i,j}) & \text{if } t = 1 \\ -\text{abs}(w_{i,j}) & \text{if } t = -1 \\ w_{i,j} & \text{if } t = 0 \end{cases}$$

In the representation of the function above, $w_{i,j}$ and $w'_{i,j}$ represent elements of a matrix, whereas W and W' represent entire matrices. In such embodiments, W' represents the adjusted kernel weights 403, W represents the kernel weights 401, and t represents the monotonicity indicator vector 303.

The aggregator 411 combines the adjusted kernel weights 403 with the input vector 301 as a weighted sum to obtain an intermediate output vector 407 for the monotonic block without activation 400. In some embodiments, the aggregator 411 obtains a weighted sum of the adjusted kernel weights 403 and input vector 301 to obtain the intermediate output vector 407. In some embodiments, a bias vector 405 is applied to the intermediate output vector 407. The bias vector 405 includes values which indicate a bias which is applied to output of the monotonic block without activation 400. For example, the aggregator 411 may generate the intermediate output vector 407 based on the equation: h=W'*x+b—where h represents the intermediate output vector 407, W' represents the adjusted kernel weights 403, x represents the input vector 301, and b represents the bias vector 405.

Returning to FIG. 3, an intermediate output vector, such as the intermediate output vector 407, is applied to a composite activation function generated by the facility based on the convex constituent activation function 307 and the concave constituent activation function 309. In some embodiments, the composite activation function is a non-linear activation function. In some embodiments, the concave constituent activation function 309 is a point reflection of the convex constituent activation function 307.

Selector weights 315 and 317 represent selector weights which are used by the composite activation function to weight the participation of the constituent activation functions in the composite activation function. Selector weight 315 represents the selector weights themselves, whereas selector weight 317 is generated based on the selector weight 315. In the example depicted in FIG. 3, selector weight 315 is denoted by "s," and selector weight 317 is denoted as "1−s," thus indicating that the selector weight 315 is used to determine the selector weight 317.

In some embodiments, the facility determines the selector weights 315 based on whether the output vector 305 is known to be convex or concave. In some embodiments, when the output vector 305 is known to be concave, the facility sets each of the selector weights to zero. In some embodiments, when the output vector 305 is known to be convex, the facility sets each of the selector weights to one. In some embodiments, a predetermined portion of the selector weights are set to one and the remaining selector weights are set to zero. In some embodiments, each of the selector weights are randomly set to either one or zero.

In some embodiments, the facility determines the selector weights 315 by using auxiliary learnable weights, such as by using the function $s_i = \sigma(w_{si})$, to determine the selector weights. In some embodiments, σ represents a sigmoid function, such as, for example, $\sigma(x)=1/(1+e^x)$. In such embodiments, s represents a selector weight and w represents an auxiliary learnable weight.

The selector weights 315 and 317 are applied to each of the activation functions at the selector weight applicators 311 and 313. The activation function output aggregator 319 aggregates the output of the selector weight applicators 311 and 313 to generate the output vector 305. Thus, the composite activation function which comprises elements 307-319 of FIG. 3 may be represented by the equation: $a'(h) = s\, a(h) + (s-1)\, a(-h)$—where a' refers to the composite activation function. In embodiments where the concave constituent activation function 309 is not a point reflection of the convex constituent activation function 307, the composite activation function may be represented by the equation: $a'(h) = s\, a_1(h) + (1-s)\, a_2(h)$—where $a_1$ is the convex constituent activation function 307 and $a_2$ is the concave constituent activation function 309.

Figure 5:
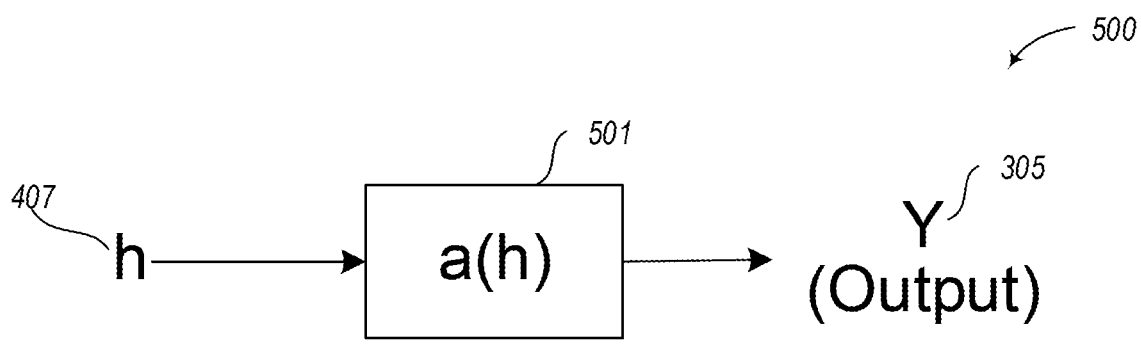
FIG. 5 is a block diagram showing a final activation block used by the facility in some embodiments.

FIG. 5 is a block diagram showing a final activation block 500 used by the facility in some embodiments. The final activation block 500 includes a final activation function 501, receives intermediate output vector 407 as an input, and outputs the output vector 305. In some embodiments, the final activation function 501 is based on any type of activation function, such as the convex constituent activation function 307, concave constituent activation function 309, composite activation function, or any other monotonic activation function. In some embodiments, the final activation function 501 is based on a type of activation function which has not been used in other parts of the machine learning model which includes the final activation block 500. In some embodiments, the final activation function 501 is based on a loss function used by the machine learning model which includes the final activation block 500. For example, the final activation function 501 may be based on a sigmoid function if the loss function is based on a binary cross entropy function. In another example, the final activation function 501 is based on a softmax function if the loss function is based on a categorical cross entropy function.

Figure 6:
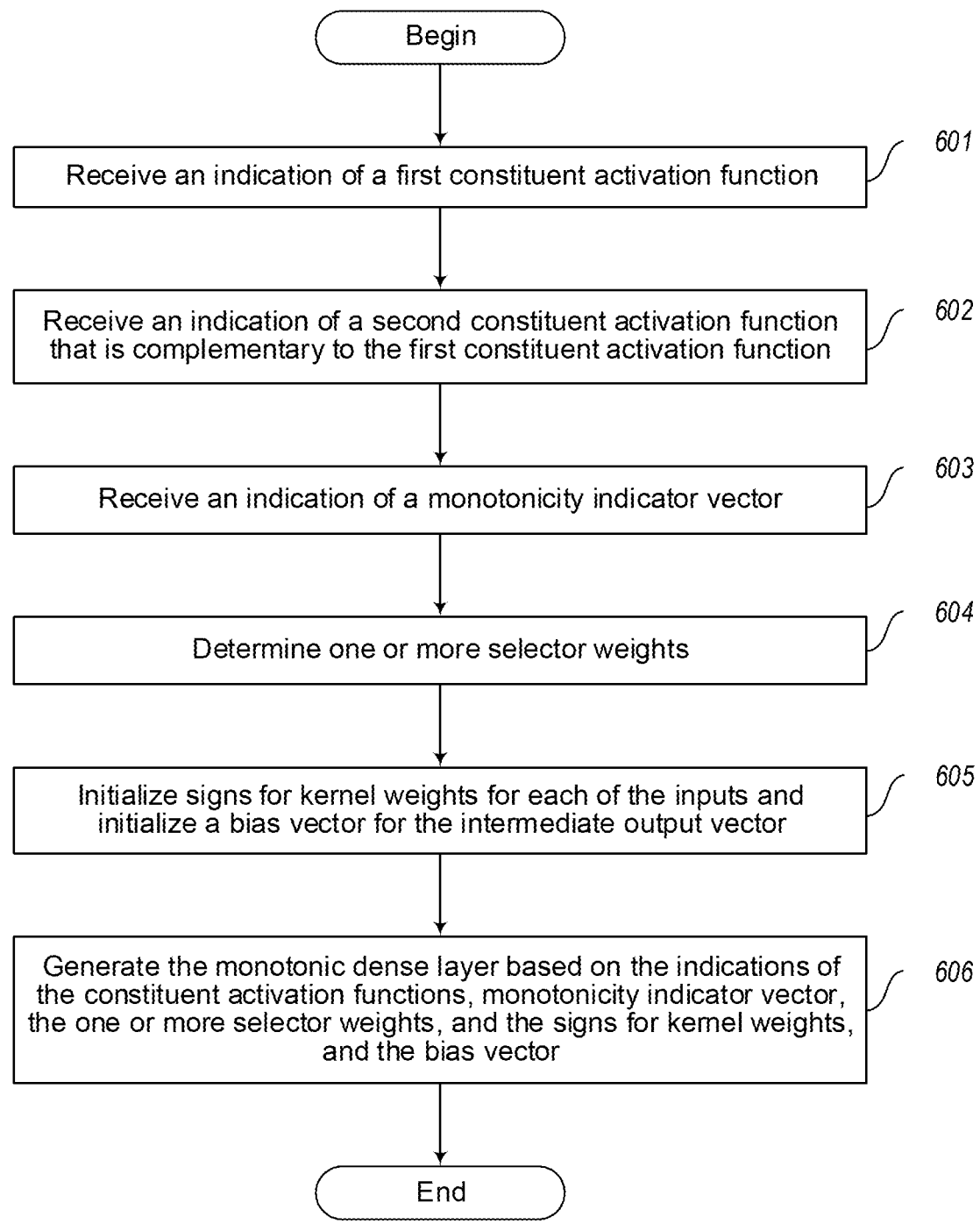
FIG. 6 is a flow diagram of a process to generate a monotonic dense layer for a machine learning model used by the facility in some embodiments.

FIG. 6 is a flow diagram of a process to generate a monotonic dense layer for a machine learning model used by the facility in some embodiments. First at act 601, the facility receives an indication of a convex constituent activation function. At act 602, the facility receives an indication of a concave constituent activation function. In some embodiments, the concave constituent activation function is a point reflection around the origin of the convex constituent activation function received in act 601. At act 603, the facility receives an indication of a monotonicity indication vector, such as the monotonicity indicator vector 303 in FIG. 3.

At act 604, the facility determines one or more selector weights for each of the output values in the output vector for the machine learning model. In some embodiments, the facility determines selector weights based on an activation selector vector, such as the activation selector vector 315 in FIG. 3.

At act 605, the facility initializes kernel weights and biases—for an intermediate output vector, such as the intermediate output vector 407 in FIG. 4. In some embodiments, the facility determines the bias vector when the machine learning model is trained. In some embodiments, the facility determines signs for the kernel weights based on a monotonicity indicator vector, such as the monotonicity indicator vector 303 in FIG. 3.

At act 606, the facility generates the monotonic fully connected layer based on the indications of the convex and concave constituent activation functions, the signs for kernel weights, the one or more selector weights, the monotonicity indicator vector, and the bias vector. In some embodiments, at act 605, the facility generates a composite activation function based on the indication of the convex constituent activation function and the indication of the concave constituent activation function, such as by using the process described in connection with FIG. 2.

After act 605, the process ends.

Figure 7:
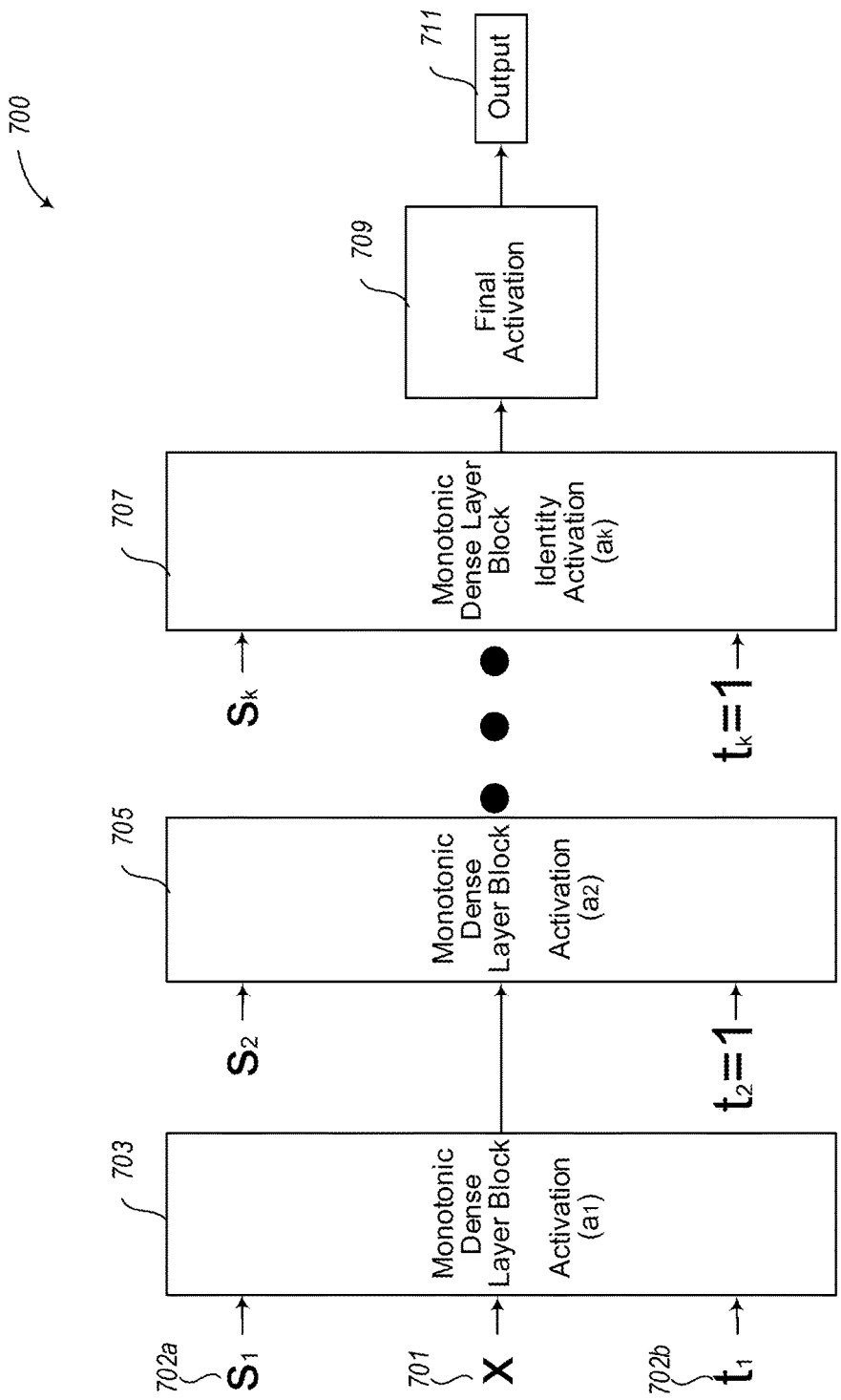
FIG. 7 is a block diagram showing monotonic dense layer blocks in a deep neural network used by the facility in some embodiments.

FIG. 7 is a block diagram showing monotonic dense layer blocks in a deep neural network 700 used by the facility in some embodiments. The deep neural network 700 includes monotonic features 701, one or more selector weight vectors 702a, one or more monotonicity indicator vectors 702b, monotonic dense layer blocks with activation 703 and 705, a monotonic dense layer block with identity activation 707, a final activation block 709, and an output block 711. The monotonic dense layer blocks with activation 703 and 705 are configured in a similar manner to the monotonic dense layer block 300 described in connection with FIG. 3. The monotonic dense layer block with identity 707 is configured in a similar manner to the monotonic block without activation 400 described in connection with FIG. 4. The final activation block 709 is configured in a similar manner to the final activation block 500 described in connection with FIG. 5.

The deep neural network 700 receives monotonic features 701, a selector weight vector 702a, and a monotonicity indicator vector 702b as input. In some embodiments, the monotonic features 701 are included in an input vector. In some embodiments, the deep neural network 700 receives non-monotonic features as input in addition to the monotonic features 701.

The deep neural network 700 uses the monotonic features 701, selector weight vector 702a, and monotonicity indicator vector 702b as input for the first layer, the monotonic dense layer block with activation 703. Output from the monotonic dense layer block with activation 703, a selector weight vector, and a monotonicity indicator vector, are used as input for the monotonic dense layer block with activation 705. Output from the monotonic dense layer blocks, such as the monotonic dense layer blocks with activation 703 and 705 are used as input along with a monotonicity indicator vector and selector weight vector for future monotonic dense layer blocks until the monotonic dense layer block with identity 707 is reached, as indicated by the ellipses between blocks 705 and 707. Output from the monotonic dense layer block with identity 707 is used as input for the final activation block 709. The final activation block 709 generates the output 711. In some embodiments, the deep neural network 700 includes non-monotonic layers in addition to the monotonic layers 703-707.

In FIG. 7, the monotonic dense layer blocks 703 and 705 each use a ReLU activation function, and monotonic dense layer block 707 uses an Identity activation function. In some embodiments, each of monotonic dense layer blocks 703, 705, and 707 may use other monotonic activation functions.

Figure 8:
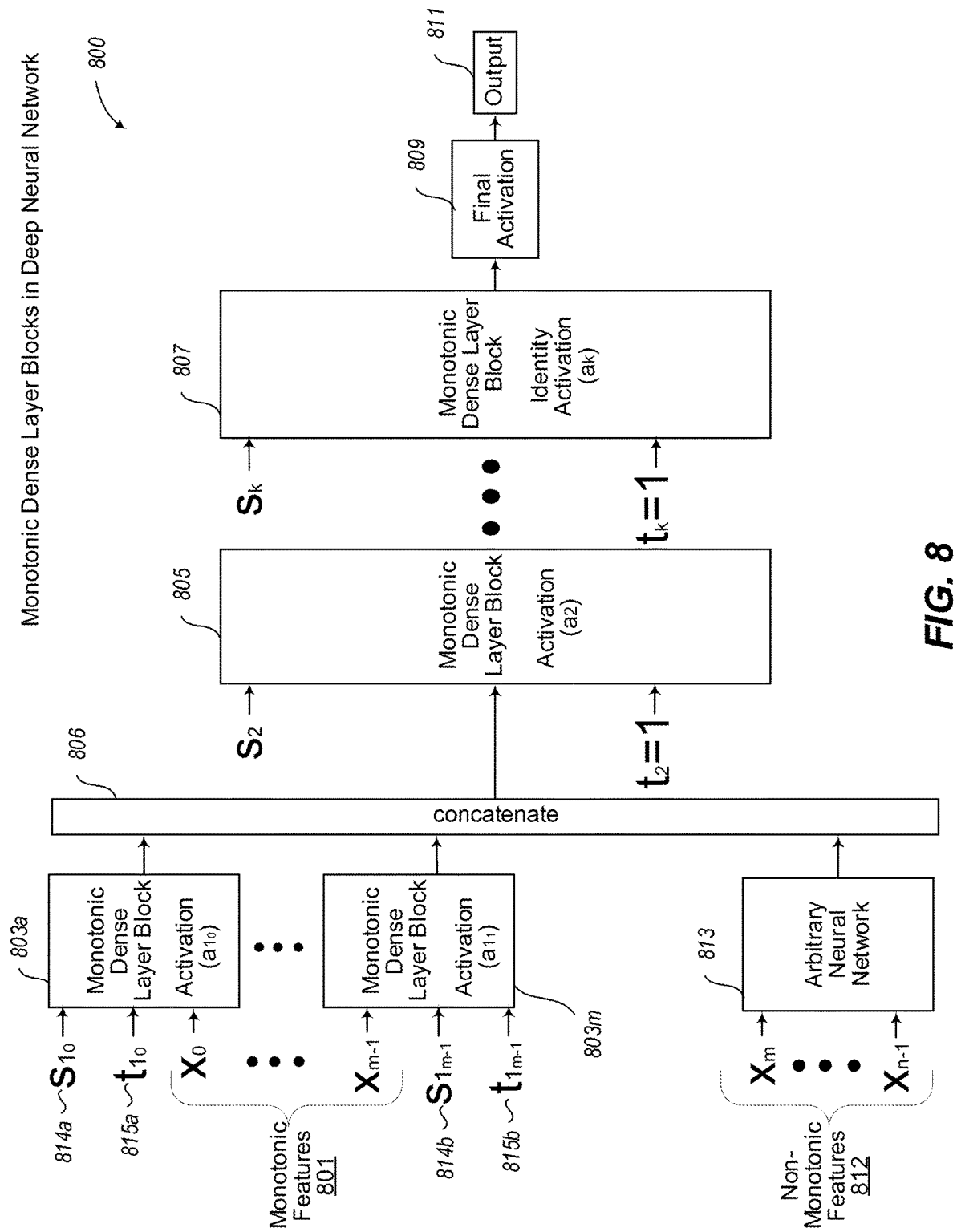
FIG. 8 is a block diagram showing monotonic dense layer blocks in a deep neural network used by the facility in some embodiments.

FIG. 8 is a block diagram showing monotonic dense layer blocks in a deep neural network 800 used by the facility in some embodiments. The deep neural network 800 includes monotonic features 801, monotonic dense layer blocks with activation 803a-803m and 805, a concatenation block 806, a monotonic dense layer block with identity 807, a final activation block 809, an output 811, non-monotonic features 812, an arbitrary neural network 813, selector weight vectors 814a-814b, and monotonicity indicator vectors 815a-815b. The monotonic features 801 are similar to the monotonic features 701 described in connection with FIG. 7. The monotonic dense layer blocks with activation 803a-803m and 805 are similar to the monotonic dense layer blocks with activation 703 and 705 described in connection with FIG. 7. The monotonic dense layer block with identity 807 is similar to the monotonic dense layer with identity 707 described in connection with FIG. 7. The final activation block 809 is similar to the final activation block 709 described in connection with FIG. 7. The output 811 is similar to the output 711 described in connection with FIG. 7. The selector weight vectors 814a-814b are similar to the selector weight vector 702a. The monotonicity indicator vectors 815a-815b are similar to the monotonicity indicator vector 702b. The non-monotonic features 812 are used as input into an arbitrary neural network 813, which may be any monotonic or non-monotonic neural network.

In the deep neural network 800, each of the monotonic features 801 are applied as input, along with a selector weight vector and monotonicity indicator vector, to one of the monotonic dense layer blocks with activation 803a-803m. The output of each of the monotonic dense layer blocks with activation 803a-803m and the output of the arbitrary neural network 813 are concatenated at the concatenation block 806. The output of the concatenation block 806, along with a selector weight vector and monotonicity indicator vector, is used as input for the monotonic dense layer block with activation 805. Output from monotonic dense layer blocks, such as the monotonic dense layer block with activation 705 is used as input, along with a monotonicity indicator vector and selector weight vector, for future monotonic dense layer blocks until the monotonic dense layer block with identity 807 is reached, as indicated by the ellipses between blocks 805 and 807. The output of the monotonic dense layer block with identity 807 is used as input for the final activation block 809. The output of the final activation block 809 is the output 811. In some embodiments, the deep neural network 800 may include non-monotonic layer blocks. In some embodiments, at least a portion of the monotonic layer blocks included in FIG. 8 may be non-monotonic layer blocks.

In FIG. 8, the monotonic dense layer blocks 803a-803m and 805 each use a ReLU activation function, and monotonic dense layer block 807 uses an Identity activation function. In some embodiments, each of monotonic dense layer blocks 803a-803m, 805, and 807 may use other monotonic activation functions.

As illustrated in FIGS. 7 and 8, a monotonic fully connected layer block generated by the facility may be used in any deep neural network, machine learning model, etc. The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. One or more instances of computer-readable media collectively having contents configured to cause a computing device to perform a method for generating a monotonic layer for a machine learning model, the one or more instances of computer-readable media constituting neither a signal per se nor a carrier wave per se, the method comprising:
   receiving an indication of a convex constituent activation function;
   receiving an indication of a concave constituent activation function that is complementary to the convex constituent activation function;
   generating a composite activation function that is made up of the convex and concave constituent activation functions;
   determining a sign for each weight of one or more kernel weights included in the monotonic layer;
   generating the monotonic layer based on the composite activation function and the sign of each weight of the one or more kernel weights;
   constructing a machine learning model that includes the generated monotonic layer; and
   operating the machine learning model to produce an inference.

2. The one or more instances of computer-readable media of claim 1, wherein the method further comprises:
   generating the concave constituent activation function based on the convex constituent activation function.

3. The one or more instances of computer-readable media of claim 1, wherein the method further comprises:
   generating the convex constituent activation function based on the concave constituent activation function.

4. The one or more instances of computer-readable media of claim 1, wherein the method further comprises:
   determining one or more selector weights for each value of an output vector output by the monotonic layer; and
   generating the composite activation function based on at least: the convex constituent activation function, the concave constituent activation function, and the one or more selector weights.

5. The one or more instances of computer-readable media of claim 4, wherein determining the one or more selector weights further comprises:
   determining one or more auxiliary learnable weights for each value of an output vector output by the monotonic layer; and determining the one or more selector weights based on the one or more auxiliary learnable weights.

6. The one or more instances of computer-readable media of claim 1, the convex constituent activation function and the concave constituent activation function are based on a single mathematical function.

7. The one or more instances of computer-readable media of claim 1, the convex constituent activation function is based on a first mathematical function and the concave constituent activation function is based on a second mathematical function different from the first mathematical function.

8. One or more storage devices collectively storing a monotonic layer implementation data structure, the data structure comprising:
  information specifying a convex constituent activation function;
  information specifying a concave constituent activation function that is complementary to the convex constituent activation function; and
  information specifying a sign for each weight of one or more kernel weights, such that the information specifying the convex constituent activation function and the information specifying the concave constituent activation function are usable to generate a composite activation function made up of the convex and concave constituent activation functions,
  such that the composite activation function and the information specifying a sign for each weight of one or more kernel weights are usable to implement the monotonic layer, and
such that a machine learning model that includes the monotonic layer is operable to produce an inference.

9. The one or more storage devices of claim 8, wherein the information specifying the concave constituent activation function is derived based on the information specifying the convex constituent activation function.

10. The one or more storage devices of claim 8, wherein data structure further comprises:
  information specifying one or more selector weights for each value of an output vector output by the monotonic layer.

11. A system for generating a monotonic layer for a machine learning model, the system comprising:
  a computing device configured to:
    determine a sign for each weight of one or more kernel weights included in the monotonic layer;
    receive an indication of a convex constituent activation function;
    receive an indication of a concave constituent activation function that is complementary to the convex constituent activation function;
    receive an indication of a selector weight vector;
    generate a composite activation function that is made up of the convex and concave constituent activation functions using the selector vector;
    generate the monotonic layer based on the composite activation function and the sign of weight of the one or more kernel weights;
    construct a machine learning model that includes the generated monotonic layer; and
    operate the machine learning model to produce an inference.

12. The system of claim 11, wherein the computing device is further configured to:
  generate the concave constituent activation function based on the convex constituent activation function.

13. The system of claim 11, wherein the computing device is further configured to:
  generate the convex constituent activation function based on the concave constituent activation function.

14. The system of claim 11, wherein the computing device is further configured to:
  determine one or more selector weights for each value of an output vector output by the monotonic layer; and
  generate the composite activation function based on at least: the convex constituent activation function, the concave constituent activation function, and the one or more selector weights.

15. The system of claim 14, wherein the computing device is further configured to:
  determine one or more auxiliary learnable weights for each value of an output vector output by the monotonic layer; and
  determine the one or more selector weights based on the one or more auxiliary learnable weights.

16. The system of claim 11, wherein the convex constituent activation function and the concave constituent activation function are based on a single mathematical function.

17. The system of claim 11, wherein the convex constituent activation function is based on a first mathematical function and the concave constituent activation function is based on a second mathematical function different from the first mathematical function.

* * * * *